United States Patent Office 3,813,440
Patented May 28, 1974

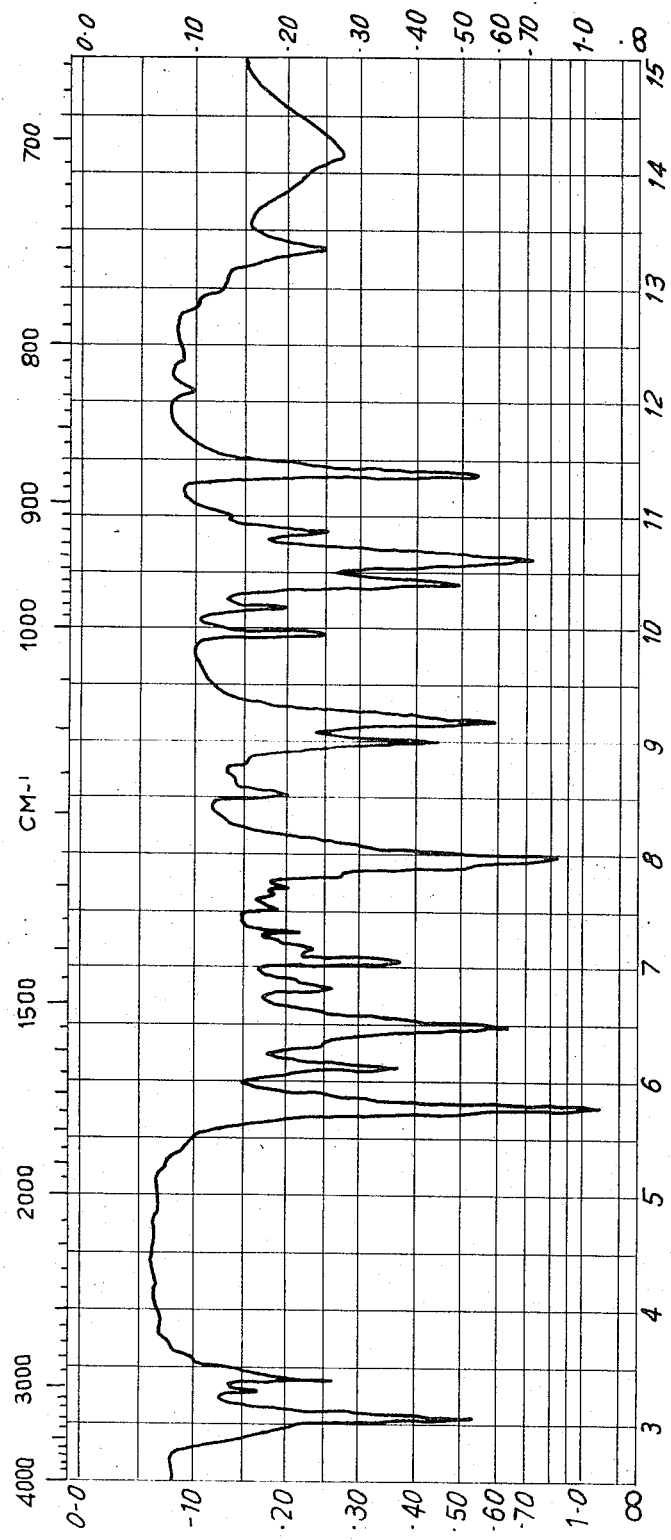

3,813,440
OXIME CARBAMATE EXERTING A
PESTICIDAL ACTION
Giuseppe Losco, Antonino Reggio, Giannantonio Michieli, and Angelo Longoni, Milan, Italy, assignors to Montedison S.p.A., Milan, Italy
Filed Dec. 1, 1971, Ser. No. 203,539
Claims priority, application Italy, Dec. 4, 1970, 32,639/70
Int. Cl. C07c 119/00
U.S. Cl. 260—566 AC                    1 Claim

ABSTRACT OF THE DISCLOSURE 5,5-dimethyl - 1,2,3 - cyclohexanetrione-tri-(N-methyl-carbamoyloxime), a new composition of matter, is useful as a pesticide. It is prepared by reacting 1,2,3-cyclohexanetrione-trioxime with methylisocyanate. Compositions containing this compound in admixture with other pesticides have been found to exert a synergistic pesticidal effect.

BACKGROUND OF THE INVENTION

1. Field of the Invention

The present invention relates to a carbamoyloxime, to a process for preparing it, to its use as a pesticide, to compositions containing it and to their use as pesticides.

SUMMARY OF THE INVENTION

The compound of the present invention is 5,5-dimethyl-1,2,3-cyclohexanetrione-tri-(N-methyl-carbamoyloxime), $$\begin{array}{c} H_3C \\ \diagdown \\ C \\ \diagup \\ H_3C \end{array} \begin{array}{c} CH_2-C=NOOCNHCH_3 \\ \diagdown \\ C=NOOCNHCH_3 \\ \diagup \\ CH_2-C=NOOCNHCH_3 \end{array}$$

This compound exerts a highly effective pesticidal action against several parasites.

5,5-dimethyl - 1,2,3 - cyclohexanetrione-tri-(N-methyl-carbamoyloxime) is, in the pure state, a white crystalline solid which is soluble in $H_2O$ at 20° C. to the extent of 0.01–0.02%, almost insoluble or very weakly soluble in cyclohexanone, carbon disulfide, amyl acetate, n-hexane, xylene, acetone, dioxane, acetonitrile, ethyl ether, ethyl benzoate, tetrachloroethylene, diisobutylcarbinol, chloroform, benzene, isophorone, and dichlorobenzene; and weakly soluble in methanol, pyridine, acetophenone and dimethylformamide. Its density, $d_4^{25}$, is 1.298. The infrared spectrum of the compound is shown in the drawing.

5,5-dimethyl - 1,2,3 - cyclohexanetrione-tri-(N-methyl-carbamoyloxime) is obtained by the reaction of 5,5-dimethyl-1,2,3-cyclohexanetrione - trioxime with methylisocyanate in accordance with the following equation;

$$\begin{array}{c} NOH \\ \parallel \\ H_3C \\ \diagdown \\ C \\ \diagup \\ H_3C \end{array} \begin{array}{c} CH_2-C \\ \diagdown \\ C=NOH + 3CH_3-N=C=O \longrightarrow \\ \diagup \\ CH_2-C \\ \parallel \\ NOH \end{array}$$

$$\begin{array}{c} N-O-\overset{O}{\underset{\parallel}{C}}-NH-CH_3 \\ H_3C \diagdown CH_2-C \\ \diagdown \diagup \diagdown \\ C \phantom{xxxx} C=N-O-\overset{O}{\underset{\parallel}{C}}-NH-CH_3 \\ \diagup \diagdown \diagup \\ H_3C \phantom{xx} CH_2-C \\ \parallel \\ N-O-\underset{\parallel}{C}-NH-CH_3 \\ O \end{array}$$

The reaction is carried out by contacting the trioxime, preferably in the presence of one of the above mentioned solvents or a dispersant, with a slight excess of methyl isocyanate with respect to the theoretical stoichiometric amount, at room temperature. The reaction is completed by heating the reaction mass to a temperature of about 40–50° C.

Compositions containing the compound of this invention as an active ingredient are also within the scope of the present invention.

It has been found that the pesticidal activity of 5,5-dimethyl-1,2,3-cyclohexanetrione-tri-(N - methyl - carbamoyloxime) can be extraordinarily enhanced by the addition of a synergizing agent.

Synergistic mixtures of the compound of this invention with isobornylthiocyanoacetate (Thanite) and piperonylbutoxide, for instance, exert a pesticidal action which is far more effective than the sum of the effects of each single component of the mixture.

Pesticidal compositions containing the compound of the present invention can be prepared without any particular difficulty by operating in accordance with commonly employed techniques in the pesticide field. Thus, for example, by intimately mixing together the various components, including inert carriers, surfactants, wetting and dispersing agents and active ingredients, and by grinding until the desired fineness is achieved, it is possible to obtain formulations such as wettable powders, which are capable of forming aqueous suspensions, suitable for spraying plants and other areas to be protected from insects and the like.

BRIEF DESCRIPTION OF THE DRAWING

The single figure of drawing shows the infrared spectrum of the compound of the present invention, 5,5-dimethyl-1,2,3-cyclohexanetrione-tri-(N - methyl - carbamoyloxime).

DESCRIPTION OF THE PREFERRED EMBODIMENTS

The following, non-limiting examples are presented to illustrate the basic features of the invention.

EXAMPLE 1

Preparation of 5,5-dimethyl-1,2,3-cyclohexanetrione-tri-(N-methyl-carbamoyloxime)

6.96 g. (0.035 moles) of 5,5-dimethyl-1,2,3-cyclohexanetrione-trioxime and 50 ml. of dioxane were introduced into a 250 ml. flask provided with a stirrer, a thermometer and a cooler, and stirred to form a suspension. Three drops of triethylamine were then added as the catalyst. Thereafter, 5.98 g. (0.126 moles) of methyl isocyanate were slowly added over about 20 minutes. During this addition, a considerable amount of heat was generated, causing the temperature to rise rapidly. To prevent the temperature from exceeding 40° C., the flask was immersed in a water bath. Complete solution was obtained when about half of the isocyanate had been added.

On completion of the isocyanate addition, the reaction mixture was heated to 40° C. and maintained at this temperature for 2 hours; then it was heated to 50° C. and maintained at this temperature for 2 additional hours.

The mixture contained in the reactor was then concentrated under vacuum in a waterbath until almost all of the solvent was removed. To the residue thus obtained, 15 ml. of methanol were added. The resulting mixture was then allowed to stand at 10° C. for 20 minutes. 2.9 g. of a yellowish-white solid product, having a melting point of 168–170° C., were thus obtained. 1.2 additional grams of product having a melting point of 167–170° C. (melting point mixed with the previous product, 168–170° C.) were obtained by evaporating the mother liquors to dryness under vacuum and by successively washing the residue with methanol. Carbamic nitrogen analysis: calculated 11.35; found: 11.00.

EXAMPLE 2

Preparation of 5,5-dimethyl-1,2,3-cyclohexanetrione-trioxime

The method followed was that for preparing vic-dioximes from alpha-bromo-ketones described in the article entitled: "The Synthesis of vic-Dioximes from Symmetrical Ketones" by R. Belcher, W. Hoyle, and T. S. West—J. Chem. Soc. 1958 III page 2743, in accordance with the equation:

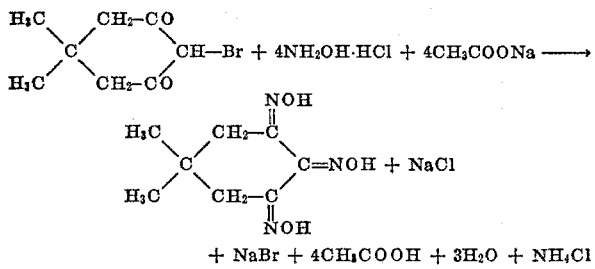

65.6 g. of $CH_3COONa$ (0.80 moles) were dissolved in a mixture consisting of 100 ml. of $H_2O$ and 80 ml. of methanol in a 500 ml. flask. The solution was then heated to boiling. After addition of 42.2 g. (0.60 moles) of $N_2OH.HCl$, 22 g. (0.10 moles) of bromo-dimedone were gradually added over about 40 minutes. When the bromo-dimedone had been entirely added, the mixture was heated to about 84° C. and maintained at that temperature for 1 hour and 30 minutes.

At the end of this heating, 75 ml. of the solvent mixture were distilled off from the reactor, and the residue was then allowed to cool to room temperature. The pink precipitate thus formed was separated by filtration, washed on the filter with iced water and dried in an oven at 60° C. 12 g. of dry product, having a melting point of 183°–185° C. (decomp.), were thus obtained. Subsequently, 3.1 additional grams of the product were crystallized from the mother liquors.

The following examples illustrate the use as a pesticide of 5,5-dimethyl-1,2-cyclohexanetrione-tri-(N-methylcarbamoyloxime) and its effectiveness against a number of different insect varieties.

EXAMPLE 3

Macrosiphum solani

Potato seedlings cultivated in pots were infested with adult female aphides and, after some hours, sprayed with an aqueous dispersion of the compound of the present invention in a concentration of 0.02%. The aphid mortality after 24 hours was 100%.

EXAMPLE 4

Aphis fabae

Broad-bean seedlings cultivated in pots were infested with young and adult aphides and, after some hours, sprayed with an aqueous dispersion of the compound of the present invention in a concentration of 0.002%. The aphid mortality after 24 hours was 100%.

EXAMPLE 5

Heliotrips haemorrhoidalis

The compound of the present invention was applied by spraying it, in a 0.01% aqueous dispersion, on bitter orange seedlings cultivated in pots. After two days, thrips larvae and adults were put on the seedlings' leaves. The mortality after 24 hours was 100%. The death of the insects began a few minutes after they had been put on the seedlings.

EXAMPLE 6

Locusta migratoria

Maize leaves were sprayed with a 0.015% aqueous dispersion of the compound of the present invention and, after some hours, were fed to 8-day old larvae. The mortality after 72 hours was 100%.

EXAMPLE 7

Leptinotarsa decemlineata (A) Potato seedlings cultivated in pots were sprayed with an aqueous dispersion of the compound of the present invention as set forth in Table I below and, after thorough drying, five days old larvae and adults were put on the sprayed seedlings. Most of the insects died within half an hour after contact with the seedlings.

TABLE I

| Stage | Concentration, percent | Mortality after 72 hrs. percent |
|---|---|---|
| Larvae | 0.0004 | 100 |
| Adults | 0.008 | 100 |

(B) Potato seedlings cultivated in an open field were sprayed with a 0.04% aqueous dispersion of the compound of the present invention. After 2 days, well developed larvae and adults were suitably confined to some of said seedlings. All the larvae and all the adults died within 5 hours, most of them within a few minutes after contact with the sprayed seedlings.

(C) About 25 cm. high potato seedlings cultivated in pots were utilized for the test. Around the stem of each of them, a solution of the compound of the present invention in dimethylformamide was distributed by a micropipette in such a manner as to apply 1 mg. of the compound to each seedling. 24 hours later, middle-aged larvae and adults of L. decemlineata were put on the seedlings' stems and leaves. A suitable screen was interposed between the treated zone and the test insects in order to prevent any possible effect of the compound on them due to direct contact or fumigation. A few minutes after contact with the seedlings, many insects were already dead. All of the larvae were dead after 6 hours; all of the adults were dead after 72 hours.

(D) 25 cm. high potato seedlings, each one cultivated in a baked clay pot having a 1 liter capacity, were utilized. The earth of each pot was uniformly wetted with 100 ml. of a 0.001% aqueous dispersion of the compound of the present invention. After 24 hours, well developed L. decemlineata larvae were put on the stems and leaves of the seedlings. A suitable screen was interposed between the earth and the test insects in order to prevent any possible effect of the compound on such insects due to direct contact or fumigation. After 48 hours, all of the insects were dead. Again, the death of the insects began a few minutes after they had been put on the seedlings.

EXAMPLE 8

Ceratitis capitata (A) The compound of the present invention was applied by spraying it, in the form of a 0.025% aqueous dispersion, on bitter orange seedlings cultivated in pots. Two days later, the stem and leaves of each seedling were enclosed in a little wire net cage into which *C. capitata* adults were introduced. The mortality after 24 hours was 100%. The death of the insects occurred a few minutes after contact with the seedlings.

(B) A metal sheet provided with several holes of 1 mm. diameter each was placed on the tops of glass pots containing *C. capitata* adults. Subsequently, some cotton wool slightly wet with a 0.01% aqueous dispersion of the compound of the present invention to which some honey had been added, was laid upon this sheet. All the flies died, and the death of each of them occurred a few minutes after they had sucked the liquid by inserting the mouth apparatus through one of the sheet's holes.

EXAMPLE 9

*Dacus oleae*

Some olive seedlings cultivated in pots were sprayed with a 0.02% aqueous dispersion of the compound of the present invention. After some hours, the stem and leaves of each seedling were enclosed in a little wire net cage, into which some *D. oleae* adults were introduced. The mortality after 10 hours was 100%. In fact, already 30 minutes after the contact, all the insects were dead.

EXAMPLE 10

*Lymantria dispar*

The compound of the present invention was sprayed in a 0.05% aqueous dispersion on lime leaves. After a few hours, some young *L. dispar* larvae were put on these leaves, enclosed in a suitable container. The mortality after 24 hours was 100%.

EXAMPLE 11

*Panonychus ulmi*

Apple seedlings cultivated in pots were infested with adult female acari and, after some hours, were sprayed with a 0.02% aqueous dispersion of the compound of the present invention. The mortality after 48 hours was 100%.

EXAMPLE 12

*Eotetranychus carpini*

Vine seedlings cultivated in pots were infested with adult female acari and sprayed with a 0.001% dispersion of the compound of the present invention. The mortality after 24 hours was 100%.

EXAMPLE 13

*Meloidogyne sp.*

(A) New-born nematode larvae were put into a 0.002% aqueous dispersion of the compound of the present invention contained between watch crystals. The mortality after 4 days was 100%.

(B) Some earth infested with nematode eggs and larvae was thoroughly mixed and divided into 8 lots; each lot was then placed into a 1 liter plastic cup. The earth of four of said cups was uniformly mixed with a 0.02% aqueous dispersion of the compound of the present invention.

The material so prepared was placed in an air conditioned room wherein the temperature was maintained at 24° C., and the relative humidity at 65%, this room being lighted for 15 hours per day with 2,500 lux neon lamps. The moisture degree of the soil in the eight pots was maintained for the duration of the treatment at 25–30%. After 5 days, 5 tomato seedlings about 10 cm. tall were transplanted into each pot. The results were controlled 20 days after the transplantation by examining the root apparatus of each seedling.

TABLE 2

| Concentration of the compound of the present invention in the soil | Seedlings infested with the nematode | Root-galls on 20 seedlings |
|---|---|---|
| 10 p.p.m. | 0 | 0 |
| 0 (control) | 20 | 923 |

EXAMPLE 14

*Typical formulations*

| | Percent |
|---|---|
| 5,5 - dimethyl - 1,2,3 - cyclohexanetrione-tri-(N-methyl-carbamoyloxime) | 50 |
| Celite 209 | 43 |
| Atlox 4860 | 4 |
| Cellpex | 3 |

The compound of the present invention was dissolved in a volatile solvent together with the Cellpex and Atlox 4860. Then the insert carrier (Celite 209) was impregnated with the solution and the solvent, thereafter evaporated to produce granular formulations which can be used as wettable powders.

EXAMPLE 15

| | Percent |
|---|---|
| 5,5 - dimethyl - 1,2,3 - cyclohexanetrione - tri - (N-methyl-carbamoyloxime) | 5 |
| Celation MP/8 | 95 |

The ingredients are blended dry to form a granular powder suitable for application by dusting.

EXAMPLE 16

| | Percent |
|---|---|
| 5,5 - dimethyl - 1,2,3 - cyclohexanetrione - tri - (N-methyl-carbamoyloxime) | 3.3 |
| Dimethylformamide | 55 |
| Acetophenone | 36.7 |
| Atlox 4851 | 2.5 |
| Atlox 4855 | 2.5 |

Formulations of the emulsifiable liquid type are prepared by dissolving the active principle in the solvent or mixture of solvents and then adding the surfactant.

The materials identified by trade names in Examples 14, 15 and 16 are further identified below:

Celite 209—a non-calcined kieselguhr;
Atlox 4860—surfactant—a polyoxyethylene derivative mixed with fatty esters and fatty acids (Atlas Powder Co.);
Cellpex—a sodium lignosulphite;
Celatom MP/8—a kieselguhr aggregate;
Atlox 4851 and Atlox 4855—surfactants—triglyceride polyoxyethylene derivatives mixed with an alkylarylsulphonate (Atlas Powder Co.).

EXAMPLE 17

This example demonstrates that the compound of the present invention exhibits synergism when combined with the known pesticides, Thanite and piperonyl butoxide. 5, 5 - dimethyl - 1,2,3 - cyclohexanetrione-tri-(N-methyl-carbamoyloxime) was dissolved in methyl alcohol alone or together with one or both of the above additional compounds in the amounts set forth in Table 3 below.

The treatment was effected topically, by means of an Agla microsyringe, on the backs of 4-day old female *Musca domestica*. The results are also set forth in Table 3.

TABLE 3

| Compound of the present invention (gamma/fly) | Thanite (gamma/fly) | Piperonyl butoxide (gamma/fly) | Mortality (percent) |
|---|---|---|---|
| 5 | | | 13 |
| | 5 | | 0 |
| 2 | | 5 | 0 |
| 3 | | 1 | 100 |
| | | 1.5 | 100 |

Note.—Thanite is a trademark for isobornyl thiocyanoacetate.

Variations can, of course, be made without departing from the spirit and scope of the invention.

Having thus described our invention, what we desire to secure by Letters Patent and hereby claim is:

1. 5,5 - dimethyl - 1,2,3 - cyclohexanetrione-tri-(N-methylcarbamoyloxime).

References Cited

UNITED STATES PATENTS

| | | | |
|---|---|---|---|
| 3,256,330 | 6/1966 | Kilsheimer et al. | 260—566 AC |
| 3,479,405 | 11/1969 | Payne et al. | 260—566 AC |

OTHER REFERENCES

Ginnella: "Farmaco Ed. Sci." vol. 25(7), pp. 509–18 (1970).

Haines et al.: Can. J. Chem., vol. 40, pp. 1149–59 (1962).

LEON ZITVER, Primary Examiner

G. A. SCHWARTZ, Assistant Examiner

U.S. Cl. X.R.

424—327

PO-1050
(5/69)

UNITED STATES PATENT OFFICE
CERTIFICATE OF CORRECTION 201-19
Patent No. 3,813,440                                Dated May 28, 1974

Inventor(s) Giuseppe Losco et al

It is certified that error appears in the above-identified patent and that said Letters Patent are hereby corrected as shown below:

Column 1, line 9: "32,639/70" should read -- 32,639 A/70 --.

Column 3, line 40, "$N_2OH.HCl$," should read -- $NH_2OH.HCl$, --.

Column 6, third column of Table 2, in the heading:

"Root-galls on $20^1$ seedlings "    should read    -- Root-galls on 20 seedlings --.

Signed and sealed this 15th day of October 1974.

(SEAL)
Attest:

McCOY M. GIBSON JR.                    C. MARSHALL DANN
Attesting Officer                      Commissioner of Patents

PR